Patented Sept. 9, 1947

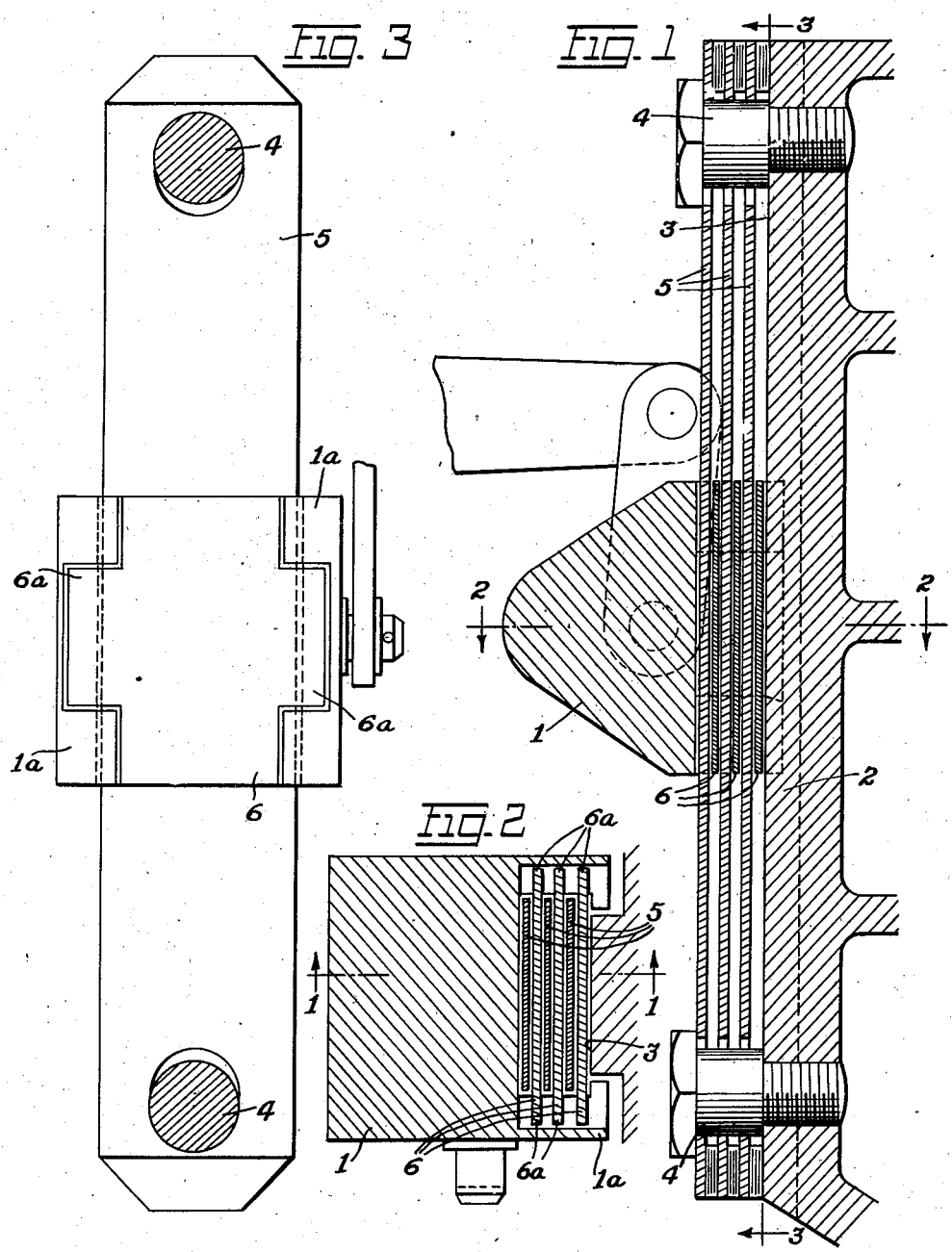

2,427,252

UNITED STATES PATENT OFFICE 2,427,252

VARIABLE LEVERAGE MECHANISM FOR VEHICLE BRAKES

Bert Henry Browall, Malmo, Sweden, assignor to Svenska Aktiebolaget Bromsregulator, Malmo, Sweden, a corporation of Sweden Application May 23, 1945, Serial No. 595,468
In Sweden May 3, 1944

4 Claims. (Cl. 188—195)

This invention relates to such brakes for vehicles, especially railway vehicles, as are provided in their brake rigging, for the purpose of varying the brake applying leverage according to the load of the vehicle, with a variable leverage mechanism comprising a shiftable fulcrum for a brake lever forming part of the brake rigging and preferably arranged as a so called reversing lever for transmitting the brake power from the brake power source (brake cylinder) to one of a couple of equalizing brake levers for distributing the brake power to both ends of the vehicle, as shown and described in my prior U. S. patent applications Ser. No. 388,217 filed May 24, 1943, and Ser. No. 539,899 filed June 12, 1944, issued as U. S. Patents Nos. 2,405,939 and 2,394,038, respectively.

As is further shown and described in my said prior applications, the shiftable fulcrum is guided by means of a guide along a sliding surface on a support and adapted to be set, before the brake lever on an application of the brake is in contact with the fulcrum, in a position corresponding to the desired brake applying force by means of a setting mechanism operated either by hand or automatically according to the vehicle load. The setting mechanism, either if operated by hand or automatically, usually comprises a spring arrangement, and due to such spring arrangement, or for possible other reasons, the setting mechanism is unfit to retain the shiftable fulcrum without yielding in the position in which it has been set. As a consequence hereof the shiftable fulcrum might possibly be displaced from its proper setting position by oblique pressure from the brake lever supported against it.

The invention has for its principal object to provide means acting automatically to prevent effectively such an unintentional displacement of the shiftable fulcrum without prejudicing the mobility of the shiftable fulcrum during the setting operation and without diminishing the possibility of setting the shiftable fulcrum in any desired position within the whole setting range.

A further object of the invention is to provide a laminar friction holding device responsive to pressure exerted by the brake lever on the shiftable fulcrum for locking the latter to the support for the same.

Still further objects of the invention will be apparent from the following description of a preferred form of the invention illustrated in the accompanying drawing in which:

Fig. 1 shows the arrangement of the shiftable fulcrum in section along the line I—I in Fig. 2, Fig. 2 shows a cross section along the line II—II in Fig. 1 and Fig. 3 shows a section along the line III—III in Fig. 1.

In the drawing, 1 indicates the shiftable fulcrum for the brake lever, not shown, while 2 indicates the support providing a sliding surface 3 for the shiftable fulcrum 1. The latter is guided in its movement along the sliding surface 3 by means of a guide parallel to the sliding surface and formed by a number of, for example three, long laminae 5 connected to the support 2 at both ends by bolts 4. Other laminae 6 alternate with the laminae 5 and are connected to the shiftable fulcrum 1. The laminae 6 may be retained in place for instance by being provided with projections 6a fitting recesses in the insides of edge flanges 1a on that side of the fulcrum 1 which faces the support 2. The laminae 5 and 6 are arranged in such a way as to form a laminar friction holding device actuated by the pressure exercised on the shiftable fulcrum 1, in any position of the same, by the brake lever. Said friction holding device offers no appreciable frictional resistance to movement of the shiftable fulcrum 1 along the guide formed by the long laminae 5, as long as the fulcrum 1 is not loaded by the brake lever coacting with it, but as soon as the brake lever has been moved into contact with, and begins to exercise pressure upon, the fulcrum 1 the friction holding device is clamped and locks the fulcrum 1 to the support 2 the more firmly the higher the pressure exercised on the fulcrum by the brake lever becomes, so that possible components of this pressure parallel to the guide for the shiftable fulcrum under no circumstances can displace the latter from the position in which it has been set. Obviously, the details of this laminar friction holding device serving at the same time as a guide for the shiftable fulcrum 1 may be carried out in various ways without departing from the essential characteristics of the invention, for which reason the invention must not be considered to be limited to the embodiment herein shown and described.

What I claim and desire to secure by Letters Patent is:

1. In a variable leverage mechanism for brakes, comprising a shiftable fulcrum for a brake lever, a support providing a sliding surface along which the shiftable fulcrum is movable, and means for guiding the shiftable fulcrum in its movement along the sliding surface, a laminar friction holding device comprising long laminae connected at both ends to the support and forming the means for guiding the shiftable fulcrum in its movement along the sliding surface, and laminae alternating with said long laminae and connected to the shiftable fulcrum and arranged in such a way as to render the friction holding device responsive to pressure exerted by the brake lever on the shiftable fulcrum for locking the latter to the support.

2. In a variable leverage mechanism for a vehicle brake, comprising a shiftable fulcrum for a brake lever, and a support for said shiftable fulcrum, which support forms a sliding surface along which said shiftable fulcrum is easily movable except when loaded by the brake lever on an application of the vehicle brake, a number of coacting laminae substantially parallel to said sliding surface and disposed between the latter and said shiftable fulcrum and connected alternately to said shiftable fulcrum and to said support so as to form a laminar friction brake which will be compressed between said sliding surface and said shiftable fulcrum as soon as said shiftable fulcrum is loaded by the brake lever on an application of the brake, and which when thus compressed effectively prevents said shiftable fulcrum from being moved along said sliding surface by the load exerted by the brake lever.

3. In a variable leverage mechanism for a vehicle brake, comprising a shiftable fulcrum for a brake lever, a support providing a sliding surface along which said shiftable fulcrum is easily movable except when loaded by the brake lever on an application of the brake, and means for guiding said shiftable fulcrum in its movements along said sliding surface, a laminar friction brake comprising long laminae connected at both ends to said support and forming said means for guiding said shiftable fulcrum in its movements along said sliding surface, and laminae alternating with said long laminae and connected to said shiftable fulcrum and arranged in such a way as to render said friction brake responsive to pressure exerted by the brake lever on said shiftable fulcrum for locking the latter to said support.

4. In a variable leverage mechanism as claimed in claim 2 the additional feature that the laminae connected to the support are arranged so as to form guides for guiding the shiftable fulcrum in its movements along the sliding surface for the same on the support.

BERT HENRY BROWALL.

REFERENCES CITED

The following references are of record in the file of this patent:

UNITED STATES PATENTS

| Number | Name | Date |
| --- | --- | --- |
| 1,465,487 | Scheuer et al. | Aug. 21, 1923 |
| 1,734,839 | Van Leer | Nov. 5, 1929 |
| 1,192,955 | Thul | Aug. 1, 1916 |
| 921,471 | Shilling | May 11, 1909 |
| 487,412 | Wilson | Dec. 6, 1892 |